US008850521B2

(12) United States Patent
Khalid et al.

(10) Patent No.: US 8,850,521 B2
(45) Date of Patent: Sep. 30, 2014

(54) PROVIDING DIFFERENTIATED NETWORK SERVICES AND PRIORITIES TO VPN ROUTERS/CLIENTS

(75) Inventors: Mohamed Khalid, Cary, NC (US); Sunil Cherukuri, Morrisville, NC (US); Haseeb Sarwar Niazi, Morrisville, NC (US); Muhammad Afaq Khan, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 885 days.

(21) Appl. No.: 12/535,555

(22) Filed: Aug. 4, 2009

(65) Prior Publication Data

US 2011/0035796 A1 Feb. 10, 2011

(51) Int. Cl.
*G06F 17/00* (2006.01)
*H04L 29/06* (2006.01)
*G06F 7/04* (2006.01)
*G06F 15/16* (2006.01)
*G06F 9/00* (2006.01)
*G06F 12/00* (2006.01)
*G06F 12/14* (2006.01)
*G06F 13/00* (2006.01)
*G06F 17/30* (2006.01)
*G11C 7/00* (2006.01)
*H04L 12/46* (2006.01)

(52) U.S. Cl.
CPC ........ *H04L 12/4641* (2013.01); *H04L 63/0272* (2013.01); *H04L 63/20* (2013.01); *H04L 63/164* (2013.01)
USPC ........................ 726/3; 726/1; 726/14; 726/21

(58) Field of Classification Search
CPC .............. H04L 12/4641; H04L 63/164; H04L 63/0272; H04L 63/20
USPC ................................................ 726/1, 3, 14, 21
See application file for complete search history.

(56) References Cited

U.S. PATENT DOCUMENTS

| 7,234,058 | B1* | 6/2007 | Baugher et al. ............... 713/163 |
| 2006/0167894 | A1* | 7/2006 | Wunner ........................... 707/10 |
| 2007/0091807 | A1* | 4/2007 | Yoshikawa .................... 370/232 |
| 2008/0228942 | A1* | 9/2008 | Lor et al. ....................... 709/238 |
| 2009/0106831 | A1* | 4/2009 | Wu ................................. 726/15 |
| 2009/0257403 | A1* | 10/2009 | Jeon et al. ..................... 370/331 |
| 2010/0027529 | A1* | 2/2010 | Jackson et al. ................ 370/352 |
| 2010/0199010 | A1* | 8/2010 | Goren et al. .................. 710/244 |

(Continued)

OTHER PUBLICATIONS

Cisco Security Appliance Command Line Configuration Guide for the Cisco ASA 5500 Series and Cisco PIX 500 Series Software Version 7.0(4) Copyright © 2005 Cisco Systems, Inc.*

(Continued)

*Primary Examiner* — Kambiz Zand
*Assistant Examiner* — Benjamin Kaplan
(74) *Attorney, Agent, or Firm* — Fernando Hale & Chang LLP

(57) ABSTRACT

In one embodiment, a first network device receives a priority message from a second network device, wherein the priority message conforms to a connection establishment protocol and indicates a priority associated with the second network device. The first network device obtains the priority from the priority message and stores the priority. The first network device allocates resources for at least one of control or data plane processing to the second network device in accordance with the priority.

20 Claims, 7 Drawing Sheets

(56) References Cited

U.S. PATENT DOCUMENTS

| | | | |
|---|---|---|---|
| 2010/0228962 A1* | 9/2010 | Simon et al. | 713/150 |
| 2011/0016314 A1* | 1/2011 | Hu et al. | 713/168 |
| 2011/0051751 A1* | 3/2011 | Takeuchi et al. | 370/501 |
| 2011/0149145 A1* | 6/2011 | Ramos et al. | 348/441 |
| 2011/0273978 A1* | 11/2011 | Murayama et al. | 370/216 |

OTHER PUBLICATIONS

Cisco White Paper Control Plane Security Overview in Cisco IOS Software Copyright © 1992-2007 Cisco Systems, Inc.*

Management Plane Protection Feb. 27, 2006 © 2006 Cisco Systems, Inc. All rights reserved.*

Request for Comments: 2474 Definition of the Differentiated Services Field (DS Field) in the IPv4 and IPv6 Headers Dec. 1998.*

Virtual Private Network, from Wikipedia, the free encyclopedia printed from website: http://en.wikipedia.org/wiki/Virtual_private_network on Aug. 3, 2009; 7 pgs.

Quality of Service, from Wikipedia, the free encyclopedia printed from website: http://en.wikipedia.org/wiki/Quality_of_service on Aug. 3, 2009; 10 pgs.

D. Harkins and D. Carrel, "The Internet Key Exchange (IKE)," Cisco Systems, Network Working Group, RFC 2409, Nov. 1998; 39 pgs.

Maughan, et al., "Internet Security Association and Key Management Protocol (ISAKMP)," Network Working Group, RFC 2408, Nov. 1998; 8 pgs.

D. Piper, "The Internet IP Security Domain of Interpretation for ISAKMP," Network Alchemy, Network Working Group, RFC 2407, Nov. 1998; 33 pgs.

S. Kent and R. Atkinson, "Security Architecture for the Internet Protocol," Network Working Group, RFC 2401, Nov. 1998; 67 pgs.

* cited by examiner

| Next Payload 608 | RESERVED | Payload Length |
|---|---|---|
| Domain of Interpretation (DOI) ||| 
| Protocol-ID | SPI Size | Notify Message Type 604 |
| Security Parameter Index (SPI) 606 |||
| Notification Data = Priority Update 602 |||

FIG. 6

PROVIDING DIFFERENTIATED NETWORK SERVICES AND PRIORITIES TO VPN ROUTERS/CLIENTS

BACKGROUND

1. Technical Field

This disclosure relates generally to methods and apparatus for providing and implementing priorities to allocate resources to network devices in a network such as a Virtual Private Network (VPN).

2. Description of the Related Art

A majority of enterprise and Service Provider customers today secure traffic over public and private networks. Virtual Private Networks (VPNs) are often used to secure traffic. One common deployment of a VPN network is the use of a Hub-and-Spoke architecture, where the hub is in a data center or a corporate headquarter, and the spokes represent different branches, clients, peers or locations. However, these branches are not all equal. For instance, a bank branch operating in a small town offering basic services is not equivalent to a large metropolitan branch providing a variety of business services.

In today's technology, all branches are generally treated as equal when resources are allocated on the hub device.

BRIEF DESCRIPTION OF THE DRAWINGS

FIG. 6 is a diagram illustrating an example Priority Update Message.

DESCRIPTION OF EXAMPLE EMBODIMENTS

Figure 1:
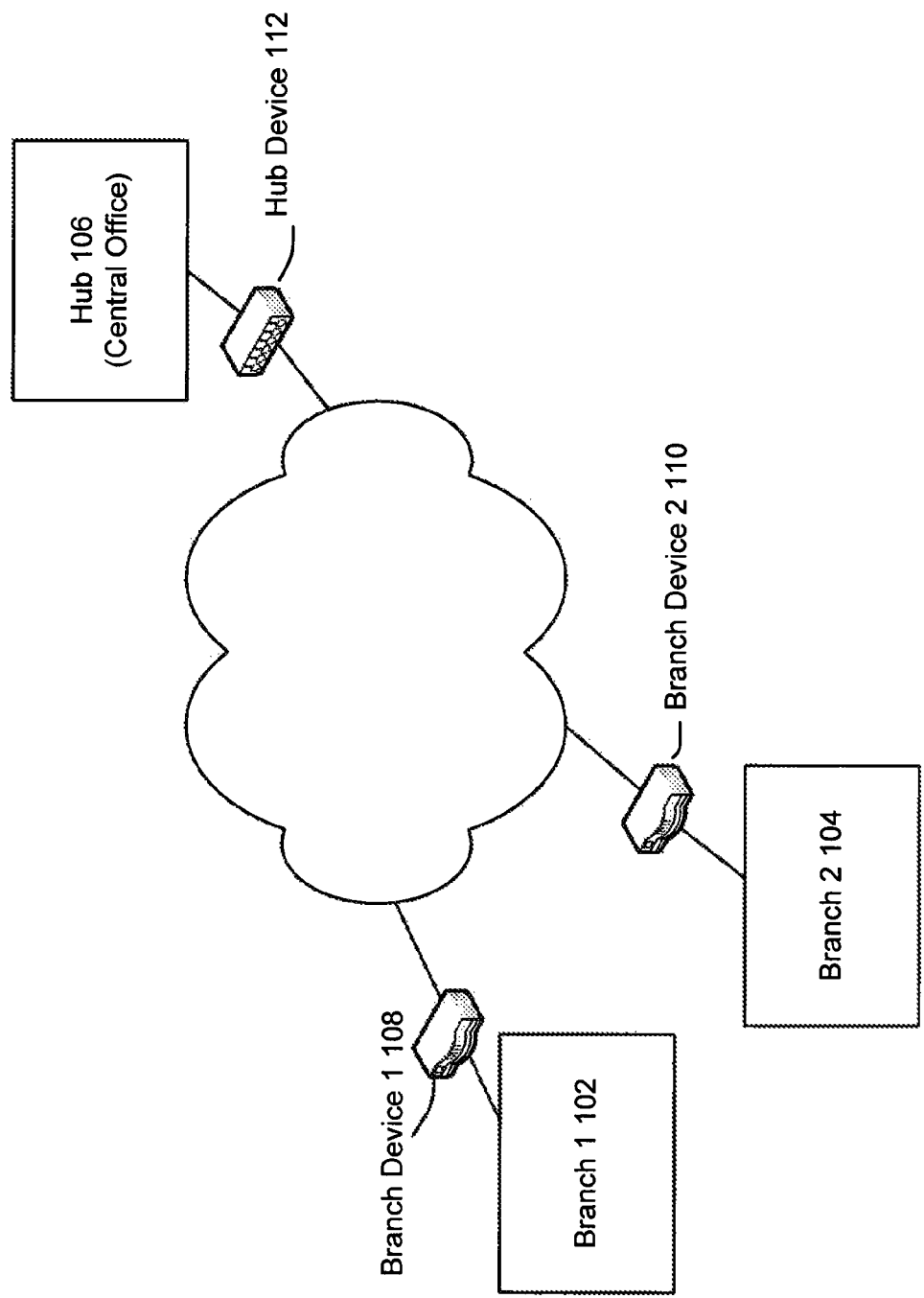
FIG. 1 is a diagram illustrating an example system in which various embodiments may be implemented.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a first network device receives a priority message from a second network device, wherein the priority message conforms to a connection establishment protocol and indicates a priority associated with the second network device. The first network device obtains the priority from the priority message and stores the priority. The first network device allocates resources for at least one of control or data plane processing to the second network device in accordance with the priority.

Specific Example Embodiments

Currently, in a Hub-and-Spoke VPN architecture, it is possible to provide differentiated Quality of Service (QoS) services, but priority handling cannot be performed for control plane messages for the different branches. In other words, there is no way to differentiate between a highly critical branch device and a less critical branch device. Furthermore, in Service Provider deployments, there is no way to differentiate or provide priority handling to different groups of customers, or to differentiate between different groups within a customer.

There are a variety of circumstances in which it would be desirable to provide preferential treatment to different branches and associated devices. For instance, there may be a limited number of resources available to the control plane and/or data plane. As one example, there could be an outage in the network that causes all tunnels to drop and re-establish with the hub. In some instances, all of the branches may try to re-establish tunnels at the same time. On a hub device terminating a large number of tunnels from branches, attempting to bring up all of the tunnels simultaneously would be very Central Processing Unit (CPU) intensive.

The disclosed embodiments support the treatment of spokes by a hub in a VPN Hub-and-Spoke architecture in accordance with their importance. In accordance with one embodiment, this may be accomplished by communicating a priority in a packet transmitted in accordance with a connection establishment protocol. A connection establishment protocol may be a protocol such as Internet Key Exchange (IKE), which may be used to establish a tunnel between two different entities. Other connection establishment protocols include Point-to-Point Protocol (PPP), Transport Layer Security (TLS), and Secure Sockets Layer (SSL).

Connection establishment protocols do not prioritize the various devices or connections, nor do they prioritize tunnel re-key requests over new tunnel setups. Similarly, there fails to exist a mechanism for establishing tunnels from a hub device to critical branches before establishing tunnels from the hub device to less critical branches. As a result, critical branches may suffer a loss of service.

The disclosed embodiments may be applied to assign priorities to branches or otherwise associate priorities with branches. A hub may then prioritize the allocation of resources to the branches in accordance with the priorities. Specifically, the hub may prioritize the allocation of resources for control and/or data plane processing (e.g., communications) in accordance with the priorities. For instance, the priorities may be used to prioritize tunnel setups, rekeying, or reestablishing of tunnels after an outage.

FIG. 1 is a diagram illustrating an example system in which various embodiments may be implemented. One type of VPN topology is the Hub-and-Spoke VPN network. In the Hub-and-Spoke network, all branch offices (e.g., spokes), shown in this example as Branch 1 102 and Branch 2 104, may connect to a central office (e.g., hub), Hub 106. Thus, each branch office is able to access resources at the central office, Hub 106, as well as the other branch offices, by accessing a corresponding local VPN gateway (e.g., router), Branch Device 1 108 or Branch Device 2 1140, to link to a Hub Device 112 such as a VPN gateway (e.g., router) associated with the central office.

Highly critical branches may be configured to send a high (e.g., highest) priority to the Hub 106. The Hub 106 can then offer preferential treatment to the critical branches. Thus, a branch device such as a VPN gateway (e.g., router) at each of the branches may be configured with a priority. For example, the priority may be a numerical value or a label indicating a particular priority level.

Priority information may be configured on each branch site or branch device (e.g., VPN device). For instance, the priority information may be configured within an Internet Security Association and Key Management Protocol (ISAKMP) profile, Easy VPN (EzVPN) profile, or Crypto Map (depending upon the type of Internet Protocol Security (IPsec) VPN being used). The priority can therefore be configured for branch devices (e.g., VPN routers) such as Site-Site IPSec, EzVPN, Dynamic Multipoint Virtual Private Network (DMVPN), and Group Encrypted Transport VPN (GET VPN) branch routers. Furthermore, for EzVPN, we can also associate priorities based upon EzVPN group names, so that the hub can also assign priorities locally (or obtain priorities from a AAA server during ModeConfig). With respect to GET VPN, a GROUP-ID may be mapped to priority information.

Similarly, the hub device may also be configured with priorities. For example, the priorities may be based upon an IP address, a group name (e.g., for EzVPN), or a group ID (e.g., for GET VPN). This priority information may help to prioritize control and/or data packets for hub-initiated tunnels, as well as other scenarios in which the hub device may initiate processing (e.g., rekeying in the control or data plane).

When a branch device begins negotiation with a hub device, it may send priority information in a packet conforming to a connection establishment protocol. In one embodiment, the packet is a first packet transmitted during the negotiation. For instance, the packet may be transmitted as the first packet in a Main Mode exchange or an Aggressive Mode exchange in accordance with the IKE protocol. A hub device may then allocate resources to the branch device in accordance with the priority. In this manner, a branch may convey a priority enabling a remote hub device located at a hub of a hub-and-spoke network to allocate control and/or data plane resources.

Figure 2:
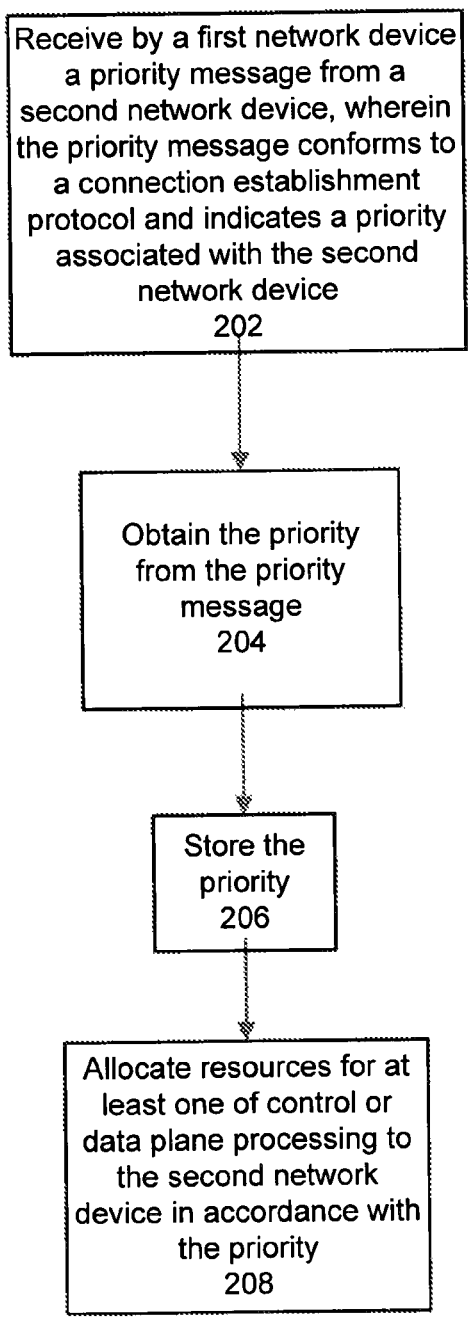
FIG. 2 is a process flow diagram illustrating an example method of allocating resources to a branch device in accordance with a priority transmitted by the branch device.

FIG. 2 is a process flow diagram illustrating an example method of allocating resources to a branch device in accordance with a priority transmitted by the branch device. A first network device such as a hub network device may receive a priority message at 202 from a second network device such as a branch network device, where the priority message conforms to a connection establishment protocol and indicates a priority associated with the branch network device. The connection establishment protocol may be IKE. An example priority message will be described in further detail below with reference to FIGS. 5A-5B.

The hub network device may obtain the priority from the priority message at 204 and store the priority at 206. For instance, the priority may be stored such that the priority is associated with the branch network device or set of network devices (e.g., group within a branch). There are a variety of ways in which the priority may be stored. For instance, the priority may be stored in association with a tunnel (e.g., tunnel endpoint) or security association. This may be accomplished by storing the priority in one or more security association databases such that the priority is associated with one or more security associations.

In one embodiment, a first security association database may be associated with the control plane and a second security association database may be associated with the data plane, where a tunnel in the control plane is established via the connection establishment protocol. In one embodiment, the first security association database is an IKE database and the second security association database is an IPsec database. Specifically, the priority may be stored in association with a security association (or tunnel) in the IKE database, enabling packets conforming to the connection establishment protocol to be prioritized. In addition, the priority may be stored in association with two security associations in the IPsec database, wherein the two security associations include an inbound security association (or tunnel) and an outbound security association (or tunnel). The inbound security association may be used to decrypt packets received via an inbound interface, while the outbound security association may be used to encrypt packets transmitted via an outbound interface. By storing the priority in association with the inbound and/or outbound security associations, it is possible to prioritize inbound and/or outbound traffic. When a tunnel is eliminated, the corresponding priority may also be deleted from the database storing information associated with the tunnel. Thus, a priority may be applied throughout the lifetime of a tunnel.

The hub network device may allocate resources for at least one of control or data plane processing to the branch network device in accordance with the priority at 208. As one example, the hub network device may compare the priority with a threshold value, and allocate resources if the priority exceeds the threshold value. As another example, the hub network device may prioritize the allocation of resources among multiple branch network devices in accordance with their corresponding priorities. These resources may include memory and/or processing resources. Moreover, the resources may include software and/or hardware resources, as well as services provided by the software and/or hardware resources.

The hub network device may allocate resources for control plane processing in accordance with the priority. For instance, the hub network device may establish (or eliminate) a tunnel between the hub network device and the branch network device in accordance with the priority of the branch network device. In addition, the hub network device may also consider the priorities of one or more additional branch network devices in determining when or if the tunnel should be established (or eliminated) between the hub network device and the branch network device. In this manner, the hub network device may process packets that conform to the connection establishment protocol in accordance with the priority.

In accordance with various embodiments, a priority that has been established may later be modified. This may be accomplished via configuration changes at the branch network device, the hub network device, or a AAA server (a server which provides for Authentication, Authorization, and Accounting services). In order to notify the hub network device of an updated priority associated with the branch network device, a branch network device may transmit an update message including the updated priority to the hub network device. The update message may conform to the connection establishment protocol and indicate the updated priority associated with the branch network device. Upon receiving the update message, the hub network device may replace the previously stored priority with the updated priority, and apply the updated priority to packets transmitted to or from the branch network device. An example update message will be described in further detail below with reference to FIG. 6.

There may be limited resources available for IKE rekeying, or bandwidth associated with a cryptography engine used in association with communications in the data plane. Thus, once a tunnel (e.g., IKE tunnel) has been established between the hub network device and the branch network device, the hub network device may allocate resources for data plane processing to the branch network device in accordance with the priority. For example, the hub network device may prioritize ingress and/or egress packet processing associated with the branch network device or corresponding branch in accordance with the priority. In addition, the hub network device may also consider the priorities of one or more additional branch network devices in determining when or if packets should be transmitted to or from the branch network device.

The priority or updated priority may also be used by the hub network device to perform rekeying. In one embodiment, the hub network device may prioritize re-key requests received from corresponding branch network devices. For instance, the hub network device may request that a re-keying be performed in accordance with the priority (or updated priority). In one embodiment, the hub network device may request that IKE perform a re-keying in accordance with the priority/updated priority. If an IKE security association does not exist, a rekey may be initiated using the priority obtained from the IPsec database. In this manner, the hub may request the negotiation of a security association for one or more branch network devices in accordance with their respective priorities.

Figure 3:
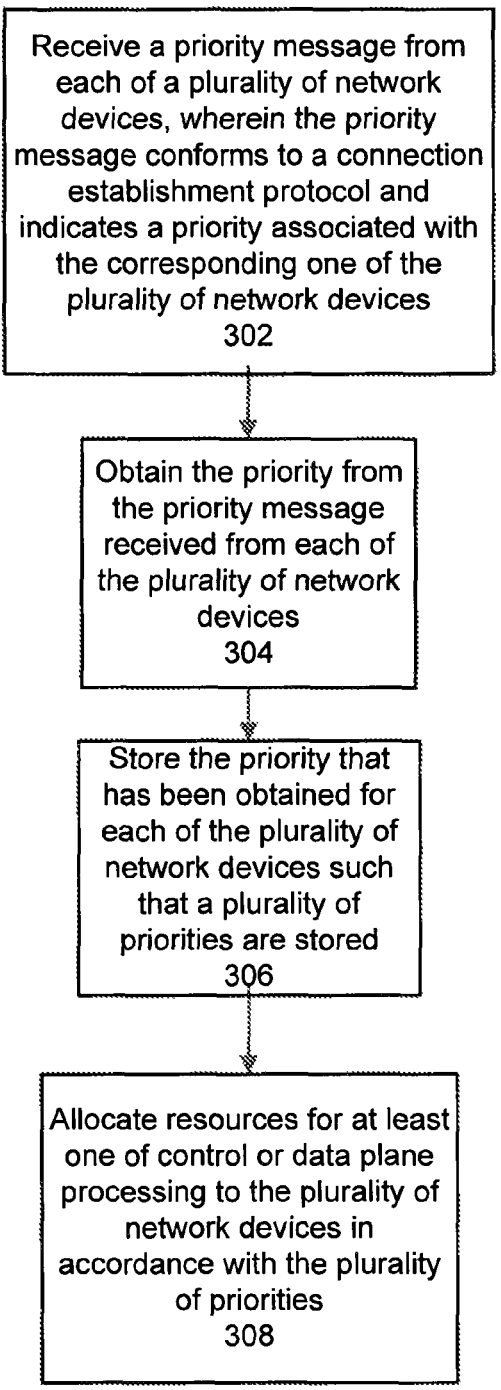
FIG. 3 is a process flow diagram illustrating an example method of allocating resources to a plurality of branch devices in accordance with priorities transmitted by the branch devices.

FIG. 3 is a process flow diagram illustrating an example method of allocating resources to a plurality of branch devices in accordance with priorities transmitted by the branch devices. A network device such as a hub network device may receive a priority message from each of a plurality of network devices (e.g., branch devices) at 302, wherein the priority message conforms to a connection establishment protocol and indicates a priority associated with the corresponding one of the plurality of network devices. The hub device may obtain the priority from the priority message received from each of the plurality of network devices at 304. The hub device may store the priority that has been obtained for each of the plurality of network devices such that a plurality of priorities is stored at 306. The hub device may therefore allocate resources for at least one of control or data plane processing to the plurality of network devices in accordance with the plurality of priorities at 308.

In one embodiment, the hub device may prioritize the setting up of tunnels between the hub device and the plurality of network devices in accordance with the plurality of priorities. Thus, where resources are limited, the hub device may set up tunnels between the hub device and one or more of the plurality of devices having a high priority. For example, the hub may prioritize the establishment of tunnels in the connection establishment protocol (e.g., IKE). As another example, the hub may prioritize the establishment of tunnels in the data plane (e.g., IPsec tunnels). The hub device may initiate the establishment of the tunnels. Alternatively, the hub device may establish tunnels in response to receiving tunnel requests from the branch devices.

Once the tunnels are established, the hub device may eliminate one or more of the tunnels that have been established. Specifically, the hub device may eliminate tunnels established in the control plane (e.g., IKE tunnel) and/or data plane (e.g., IPsec tunnel). In one embodiment, the hub device may eliminate one or more of the tunnels in accordance with the plurality of priorities. For example, the hub device may eliminate tunnels between the hub device and one or more of the plurality of devices having a low priority.

Moreover, data traffic and/or control traffic transmitted via tunnels that have been established may be prioritized in accordance with the corresponding priorities. More specifically, packets transmitted to and/or from branch devices may be processed (e.g., transmitted) in accordance with the corresponding priorities. These packets may be packets that conform to the connection establishment protocol (e.g., IKE). Alternatively, the packets may be data packets. By prioritizing packets, a hub device may transmit packets associated with a higher priority branch, while queuing packets associated with a lower priority branch for later transmission.

Figure 4:
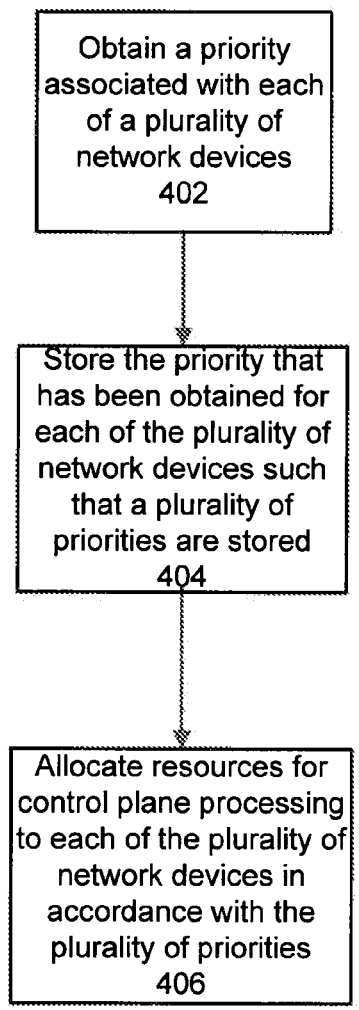
FIG. 4 is a process flow diagram illustrating an example method of allocating resources to a plurality of branch devices in accordance with priorities obtained by a hub device.

FIG. 4 is a process flow diagram illustrating an example method of allocating resources to a plurality of branch devices in accordance with priorities obtained by the hub device. A network device such as a hub device may obtain a priority associated with each of a plurality of network devices (e.g., branch devices) at 402 through a variety of mechanisms. As set forth above, the hub device may obtain a priority associated with one of the branch devices from a message such as a priority message and/or update message. Alternatively, the hub device may obtain priorities associated with one or more of the branch devices locally (e.g., where the priorities are stored at the hub device) or from a server such as a AAA server. For example, when one of the branch devices connects as a VPN client to the hub device, the hub device may use a group name to obtain its priority from a AAA server. In other embodiments, the hub device may assign priorities to various network devices. Those priorities that have been assigned by the hub device may be stored locally or via a server such as an AAA server.

The network device may store the priority that has been obtained for each of the plurality of network devices such that a plurality of priorities is stored at 404. The network device may allocate resources for control plane and/or data plane processing to each of the plurality of network devices in accordance with the plurality of priorities at 406. For instance, the network device may prioritize the establishment and/or elimination of one or more tunnels in accordance with the plurality of priorities.

In some embodiments, the hub device may send a priority message and/or update message to various network devices. In this manner, the hub device may assign priorities to various network devices or their peers. Accordingly, the branch devices and/or hub device may be capable of sending and/or receiving priority messages and/or update messages transmitted in accordance with a connection establishment protocol.

One connection establishment protocol that may be implemented in accordance with various embodiments is the IKE protocol. IKE is a protocol that may be used to set up a security association (SA) in the IPsec protocol suite. In accordance with various embodiments, a priority message or a priority update message may be sent in accordance with the IKE protocol, as will be described in further detail below with reference to FIGS. 5A-B and 6.

Figure 5A:
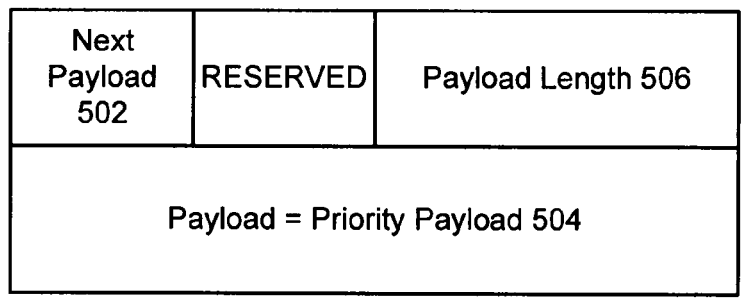
FIGS. 5A-B are diagrams illustrating an example Priority Message.
Figure 5B:
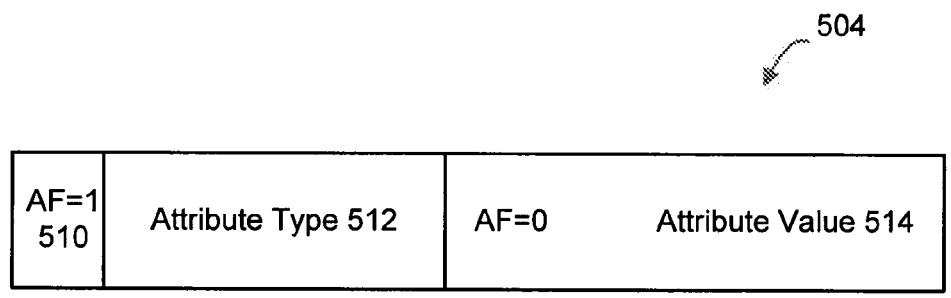

FIGS. 5A-B are diagrams illustrating an example Priority Message that may be transmitted in accordance with various embodiments. In this example, the Priority Message conforms to the IKE protocol. The Priority Message may be transmitted during the IKE negotiation to differentiate between different branches or clients. In one embodiment, a payload such as an ISAKMP private payload may be used to convey the priority of a branch.

As shown in FIG. 5A, within the ISAKMP message header, the "Next Payload" 502 type values 128-255 have been set aside for future use. In accordance with various embodiments, one of these values may be used to identify a Priority Payload 504 of a Priority Message. In other words, the Next Payload type field may be used to indicate that the payload is a Priority Payload. The Priority Payload 504 may be used to convey priority information via a numerical or string value. The Priority Message (e.g., including a Priority Payload) may be sent as a first packet of the Main Mode or Aggressive Mode. Specifically, the Priority Payload may be preceded by a Security Association (SA) payload, Proposal Payload, and Transform Payload. The Priority Message may also include a Payload Length field 506 that indicates a length of the Priority Payload 504.

The Priority Payload 504 may include a payload header that conforms to a ISAKMP payload header format. One or more data attributes of the Priority Payload 504 may be used to convey priority information.

An example Priority Payload 504 is shown in greater detail in FIG. 5B. As shown in FIG. 5B, the most significant bit, referred to as Attribute Format (AF) 510, indicates whether the data attributes follow the Type/Length/Value (TLV) format or a shortened Type/Value (TVK) format. In one embodiment, the AF bit may be marked as a one (1), to indicate that the data attributes are of the Type/Value form with a fixed length (e.g., 2 octets). The Priority Payload 504 may also include an Attribute Type 512 and Attribute Value 514. The Attribute Value 514 may be represented as a 3-bit value. Alternatively, Differentiated Services Code Point (DSCP) code bits (e.g., 6 bits of the most significant byte) may be used to convey priority information. In this manner, a branch may convey a priority enabling a remote VPN device located at a hub of a hub-and-spoke network to allocate control and/or data plane resources.

Upon receiving the Priority Message, the hub (e.g., VPN gateway) may provide differential treatment for both control (e.g., IKE) and data plane (e.g., IPsec) treatment based upon the priority through establishment and lifetime of the tunnel. Moreover, IKE Call Admission Control (CAC) can take into account the priority when allowing or disallowing connection setup requests.

Once a tunnel is established between the hub device and a branch device, an administrator may change the priority setting on the branch device. In accordance with one embodiment, this updated priority information may be sent to the hub device in a Priority Update Message that conforms to the connection establishment protocol. The hub device may then determine the change in priority of the branch device. Upon receiving the updated priority information, the hub device can use the updated priority information when processing packets such as connection establishment protocol messages (or data packets) to and/or from the branch.

FIG. 6 is a diagram illustrating an example Priority Update Message. In this example, the Priority Update Message conforms to the IKE protocol. As shown in this example, the "Notification Data" 602 within this new Notify Message may include a Priority Attribute that includes updated priority information. The Notify Message Types 32768-40959 have been set aside for private use. Thus, one of these message types may be used to indicate that the Notify Message Type 604 corresponds to the Priority Update message. As shown, the Priority Update Message may also include a Security Parameter Index (SPI) 606.

The disclosed embodiments enable priorities associated with branches to be implemented by a hub in a Hub-and-Spoke architecture to allocate resources among various branches. However, it is important to note that the examples described herein are merely illustrative. Therefore, the disclosed embodiments may be implemented by a network device to prioritize the treatment of other network devices in a network implementing a variety of architectures. Moreover, although the disclosure relates to a VPN, the disclosed embodiments may be applied in a network other than a VPN.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the disclosed embodiments are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. A general architecture for some of these machines will appear from the description given below. Further, various embodiments may be at least partially implemented on a card (e.g., an interface card) for a network device or a general-purpose computing device.

Figure 7:
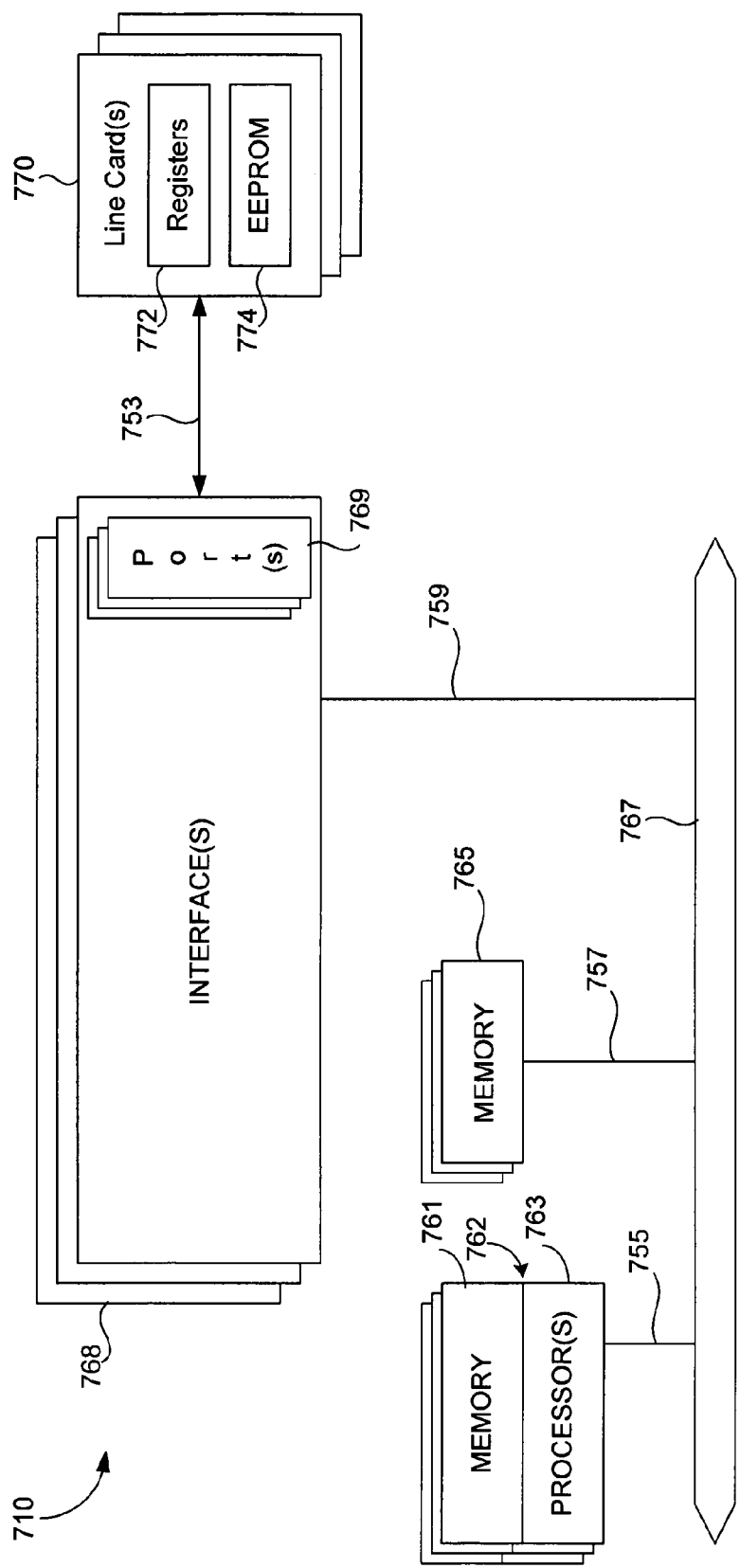
FIG. 7 is a diagrammatic representation of an example network device in which various embodiments may be implemented.

The disclosed embodiments may be implemented at network devices (e.g., hub and branch devices) such as switches or routers. For instance, the hub and branch devices may be VPN routers. Referring now to FIG. 7, a router or switch 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 710. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include one or more independent processors and, in some instances, volatile RAM. The independent processors may control such communications intensive tasks as packet switching, media control and management, as well as compression and/or encryption, as described herein. By providing separate processors for the communications intensive tasks, these interfaces allow the master microprocessor 762 to efficiently perform routing computations, network diagnostics, security functions, etc. Although the system shown in FIG. 7 is one specific router of the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
by a first network device:
receiving a priority message conforming to a connection establishment protocol from a second network device, wherein a first field of the priority message has embedded therein a value that indicates a relative priority of the second network device with respect to one or more other network devices;
obtaining the priority value from the priority message;
storing the priority value by the first network device; and
allocating resources for at least one of control and data plane processing by the first network device to the second network device in accordance with the priority value.

2. The method as recited in claim 1, wherein the priority value is stored such that the priority value is associated with the second network device.

3. The method as recited in claim 1, wherein said allocating resources comprises:
establishing a tunnel between the first network device and the second network device at a point in time determined based at least in part on the priority.

4. The method as recited in claim 1, wherein said allocating resources comprises:
establishing a tunnel between the first network device and the second network device in at a point in time indicated by the priority value and priority values associated with one or more additional network devices.

5. The method as recited in claim 1, further comprising:
prioritizing packets conforming to the connection establishment protocol in accordance with the priority value.

6. The method as recited in claim 1, further comprising:
prioritizing packets transmitted to or from the second network device in accordance with the priority value.

7. The method as recited in claim 1, wherein said allocating resources comprises:
eliminating a tunnel between the first network device and the second network device at a point in time indicated by the priority value.

8. The method as recited in claim 1, further comprising:
receiving by the first network device an update message from the second network device, wherein the update message conforms to the connection establishment protocol and includes an updated priority value associated with the second network device; and
replacing the priority value with the updated priority value.

9. The method as recited in claim 1, further comprising:
requesting that a re-keying be performed at a point in time determined based at least in part on the priority.

10. The method as recited in claim 1, wherein a second field of the priority message has embedded therein a type value identifying the priority message as a priority message.

11. The method as recited in claim 10, wherein the one or more Security Association databases include an IKE database and an IPsec database, wherein storing the priority comprises:
storing the priority value in association with a security association in the IKE database; and
storing the priority value in association with two security associations in the IPsec database, wherein the two security associations include an inbound security association and an outbound security association.

12. The method as recited in claim 10, wherein the one or more Security Association databases include a first Security Association database for a control plane and a second Security Association database for a data plane, wherein the control plane is established via the connection establishment protocol.

13. The method as recited in claim 1, wherein the connection establishment protocol is IKE.

14. The method as recited in claim 1, wherein the priority message is a first packet transmitted during negotiation of the connection establishment protocol.

15. An apparatus, comprising:
a processor; and
a memory, at least one of the processor or the memory being adapted for:
receiving a priority message confirming to a connection establishment protocol from each of a plurality of network devices, wherein a first field of the priority message has embedded therein a value that indicates a relative priority of the corresponding one or the plurality of network devices with respect to other network devices of the plurality of network devices;
obtaining the priority values from the priority messages received from each of the plurality of network devices;
storing the priority values obtained from each of the priority messages received from each of the plurality of network devices, such that a plurality of priorities are stored; and allocating resources for at least one of control or data plane processing to the plurality of network devices in accordance with the plurality of priority values.

16. The apparatus as recited in claim 15, wherein said allocating resources for at least one of control or data plane processing to the plurality of network devices comprises:

establishing tunnels between the apparatus and the plurality of network devices in an order indicated by the plurality of priority values.

17. The apparatus as recited in claim 16, wherein said allocating resources further comprises:

eliminating one or more of the tunnels that have been established, wherein eliminating is performed at one or more points in time indicated by the priority values.

18. The apparatus as recited in claim 15, at least one of the processor or the memory being further adapted for:

establishing a tunnel between the apparatus and each of the plurality of network devices such that a plurality of tunnels are established;

wherein said allocating resources for at least one of control or data plane processing to each of the plurality of network devices comprises prioritizing data traffic or control traffic transmitted via the plurality of tunnels in accordance with the plurality of priority values.

19. The apparatus as recited in claim 15, wherein said allocating resources for at least one of control or data plane processing to each of the plurality of network devices in accordance with the plurality of priority values comprises:

processing packets that conform to the connection establishment protocol in an order indicated by the plurality of priority values.

20. The apparatus as recited in claim 15, wherein the apparatus and each of the plurality of network devices is a VPN router.

* * * * *